United States Patent
Goering et al.

[19]

[11] Patent Number: 6,044,635

[45] Date of Patent: Apr. 4, 2000

[54] FEEDER SHAFT STRUCTURE FOR A COTTON HARVESTER

[75] Inventors: Kevin Jacob Goering, Cambridge; Joel Marvin Schreiner, Ankeny, both of Iowa

[73] Assignee: Deere & Company, Moline, Ill.

[21] Appl. No.: 09/143,675

[22] Filed: Aug. 31, 1998

[51] Int. Cl.[7] .................................................. A01D 45/18
[52] U.S. Cl. ............................................................. 56/34
[58] Field of Search ................................... 56/28, 34, 30, 56/126, 127, 128, 129, 130, 330

[56] References Cited

U.S. PATENT DOCUMENTS

| | | | |
|---|---|---|---|
| Re. 25,667 | 10/1964 | Jezek | 56/34 |
| 1,576,904 | 3/1926 | Francis . | |
| 1,950,902 | 3/1934 | Morse | 56/11 |
| 2,544,411 | 3/1951 | Altgelt | 56/30 |
| 2,746,228 | 5/1956 | Foster | 56/35 |
| 2,830,424 | 4/1958 | Fowler | 56/34 |
| 3,380,232 | 4/1968 | Jezek | 56/34 |
| 3,402,537 | 9/1968 | Jezek, Jr. | 56/34 |
| 3,408,800 | 11/1968 | Jezek, Jr. | 56/34 |
| 3,413,784 | 12/1968 | Jezek | 56/34 |
| 3,509,700 | 5/1970 | Jezek | 56/34 |
| 3,651,624 | 3/1972 | Bandemer | 56/28 |
| 3,729,909 | 5/1973 | Gray et al. | 56/34 |
| 3,733,796 | 5/1973 | Wood et al. | 56/220 |
| 3,772,863 | 11/1973 | Jezek | 56/34 |
| 4,313,296 | 2/1982 | Mitchell, Jr. | 56/34 |

*Primary Examiner*—Robert E. Pezzuto

[57] ABSTRACT

A vine shield for a finger-type header with feeder shafts includes a plurality of curved channel-shaped bars having upper ends releasably secured to supports extending transversely over the stripping fingers. A shaft support structure mounts two timed feeder shafts of large radius with feeder fingers projecting between the bars to define overlapping paths which eliminate most of the dead space between the shafts for improved cotton flow rearwardly over the stripping fingers. The channel-shaped bars prevent vine wrapping and open away from the axes of the shafts for improved trash shedding capabilities. The shaft support structure pivots about the rear feeder shaft axis for on-the-go vertical adjustment of the forward feeder shaft to accommodate substantial plant height variations. The feeder fingers are designed for easy attachment and removal and have a symmetrical design so they can be reversed.

13 Claims, 4 Drawing Sheets

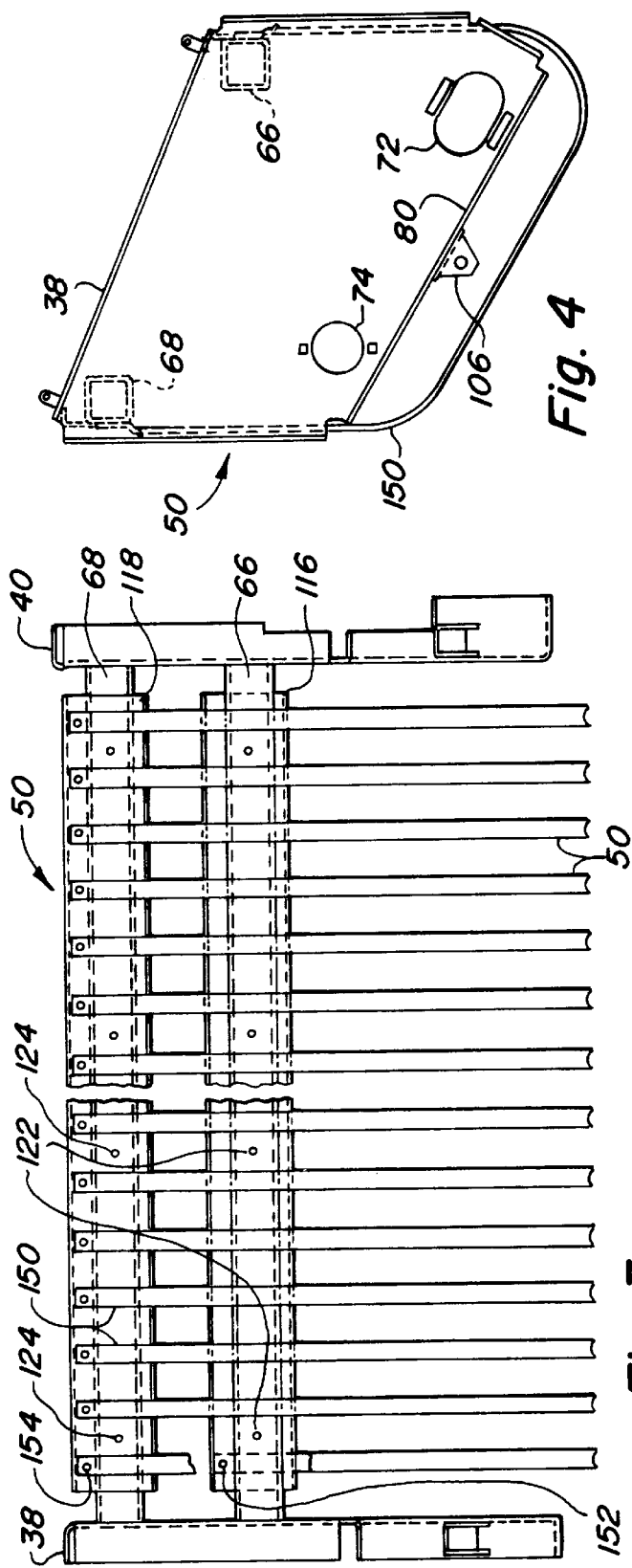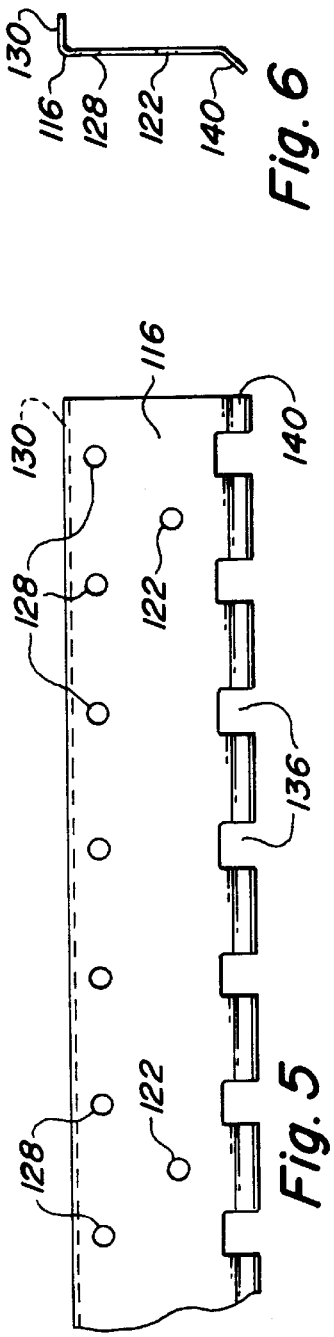

FEEDER SHAFT STRUCTURE FOR A COTTON HARVESTER

BACKGROUND OF THE INVENTION

1) Field of the Invention

The present invention relates generally to cotton harvesters, and, more specifically, to feeder shaft and vine shield structure for a cotton stripper finger-head attachment.

2) Related Art

With advances in weed control, an increased number of cotton growers are switching to ultra-narrow row cotton (UNRC) and broadcast cotton. Presently, UNRC and broadcast cotton are harvested using a finger-head attachment on a self-propelled cotton stripper. A typical finger-head attachment is shown in U.S. Pat. No. 4,358,921 assigned to Allis-Chalmers. Cotton plants are directed between narrowly spaced fingers on the header which remove the cotton from the plant. One or more rotating feeder shafts with radial projections extend transversely above the fingers to move the stripped cotton rearwardly into a cross auger. A large dead space between the feeder shafts reduces conveying efficiency. Curved fingers more closely follow the profile of the feeder shaft and eliminate some of the dead space, but the curved portions are prone to cotton sticking which results in clogging of the head. In some fields, the height of the cotton plants varies considerably. If the feeder shaft is adjusted for tall cotton, short cotton may not be efficiently harvested. If the feeder shaft is adjusted for short cotton and taller cotton plants are encountered, the stalks of the taller plants can wrap around the shaft.

Heretofore, finger-head types of strippers with feeder shafts have had problems operating efficiently in fields with vines. The vines wrap on the feeder shaft and can completely entwine the entire shaft so that cotton will no longer feed to the auger. The operator has to remove the vines by hand, which is time-consuming and difficult. Installing vine-cutting knives between the fingers has helped reduce but not eliminate vine wrapping. Providing good feeding characteristics and eliminating vine wrap has heretofore been a source of problems.

BRIEF SUMMARY OF THE INVENTION

It is therefore an object of the present invention to provide an improved feeder shaft structure for a finger-head type of cotton stripper. It is another object to provide such structure which overcomes most or all of the aforementioned problems.

It is yet another object to provide an improved feeder shaft arrangement for a finger type cotton stripper facilitating operation of the stripper in fields where cotton plant height varies considerably and where entwining weeds such as vines are present.

It is a further object of the present invention to provide a vine shield for use with a cotton harvester having a header with a rotating feeder shaft. It is another object to provide such a guard which reduces or eliminates vine wrapping on the feeder shaft. It is still another object to provide such a vine shield which is simple and inexpensive in construction and which is easy to assemble and repair.

It is still another object to provide a vine shield for a stripper type of cotton harvester having individual stationary bars with mounting structure that facilitates mounting of the bars between cotton feeding protrusions or fingers on a rotating feeder shaft. It is another object to provide a feeder shaft shield which does not require sharp edges and which does not reduce the effectiveness of the feeder shaft.

It is another object of the invention to provide an improved feeder finger structure for a cotton stripper feeder shaft. It is still another object to provide such a finger structure which is economical and easy to manufacture and attach and which is reversible.

In accordance with the above objects, a vine shield for a finger-type header with feeder shafts includes a plurality of curved channel-shaped bars having upper ends releasably secured to supports extending transversely over the stripping fingers. Only two bolts are needed to secure each bar, and the bolt locations are easily accessible for maintenance and repair. Two timed feeder shafts having relatively large effective diameters of approximately twenty inches include tines projecting between the bars and having overlapping paths to eliminate most of the dead space between the shafts for improved cotton flow rearwardly over the stripping fingers. The channel-shaped bars prevent vine wrapping and open away from the axes of the shafts for improved trash-shedding capabilities. The tines on the large diameter feeder shafts project a substantial distance downwardly from the bars toward the stripping fingers and efficiently move stripped cotton rearwardly over the stripping fingers. The feeder shafts are supported from the header by support structure that pivots about the axis of rotation of the rear feeder shaft axis for on-the-go adjustment of the forward feeder shaft vertically relative to the stripping fingers to accommodate crops of different heights. Shaft feeder finger structure is reversible on the shaft and is easy to manufacture and attach. The finger structure has a symmetrical design to provide generally identical cotton conveying characteristics when rotated in either direction about the axis of the shaft.

These and other objects, features and advantages of the present invention will become apparent to one skilled in the art upon reading the following detailed description in view of the drawings.

BRIEF DESCRIPTION OF THE DRAWINGS

FIG. 3 is a front view of a portion of the vine guard on the header of FIG. 1.

FIG. 4 is an end view of the vine guard of FIG. 3.

FIG. 5 is a front view of the connecting angle bracket on the vine guard of FIG. 3.

FIG. 6 is an end view of the bracket of FIG. 5.

DETAILED DESCRIPTION OF THE DRAWINGS

Figure 1:
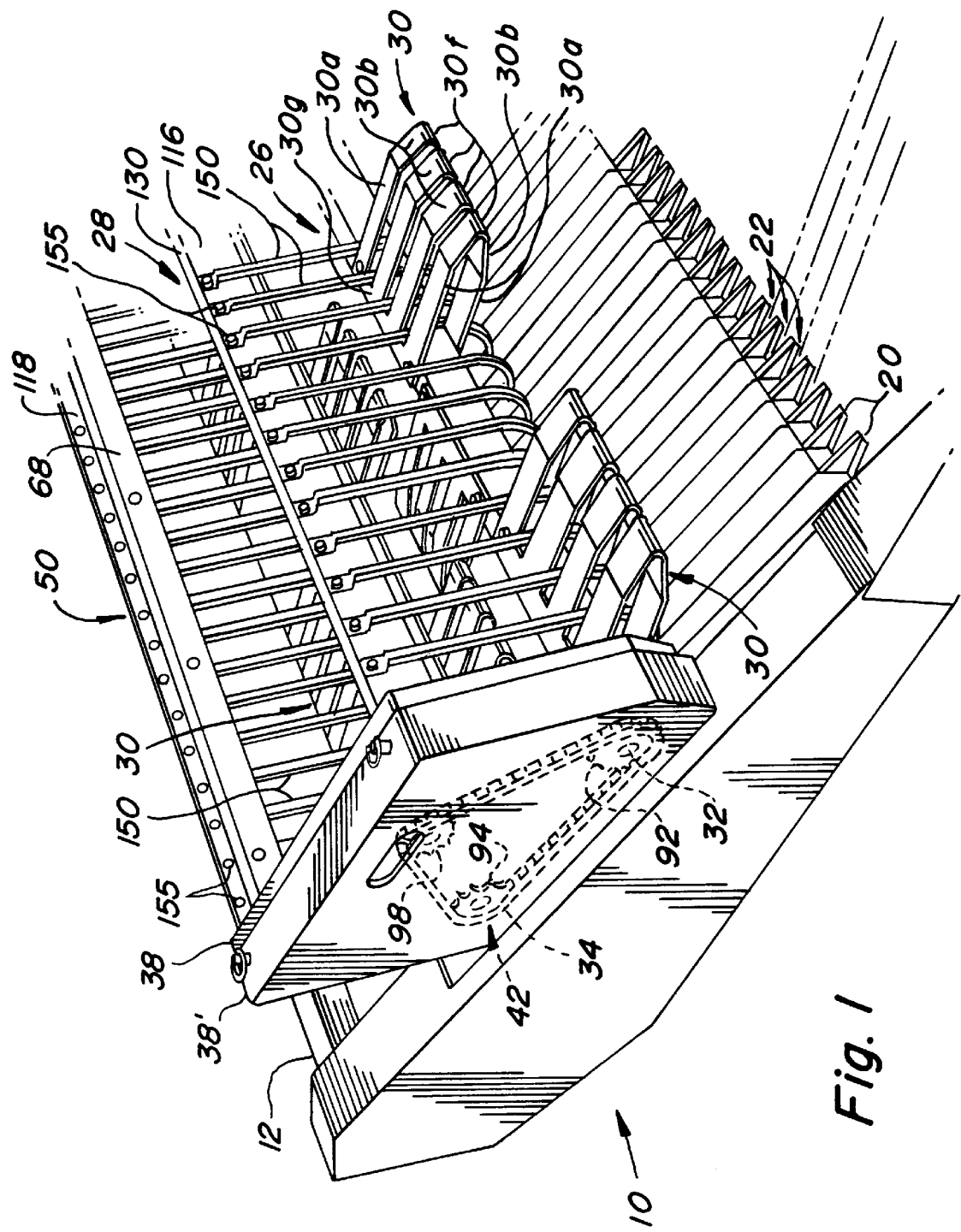
FIG. 1 is a perspective view of a portion of a cotton harvester header having stripping fingers located below rotating feeder shafts.
Figure 2:
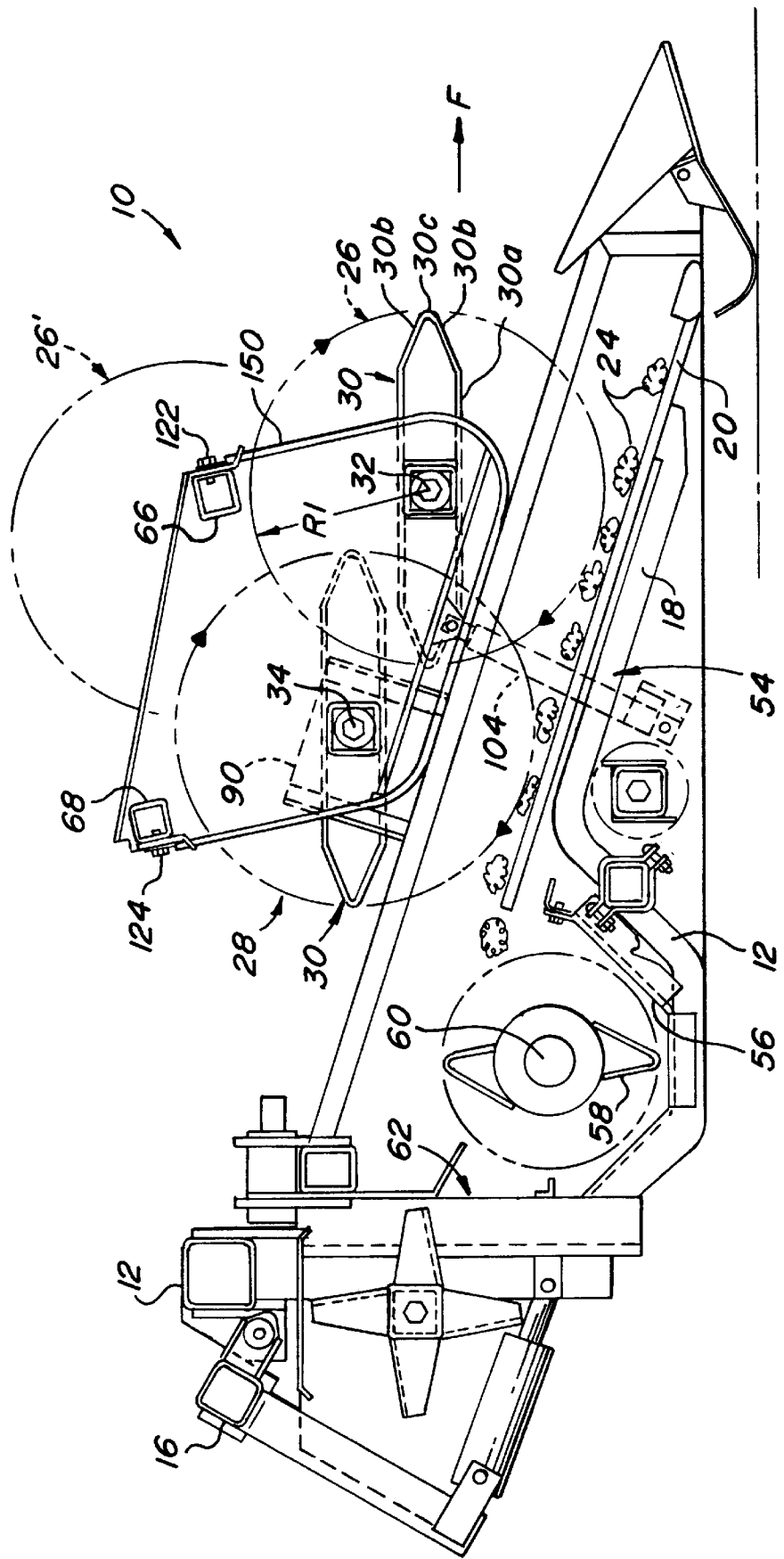
FIG. 2 is side view of a portion of the header of FIG. 1 partially cut away to better show the relative locations between the feeder shafts and the vine guard and illustrating the adjustability of the forward feeder shaft.

Referring now to FIGS. 1 and 2, therein is shown a cotton stripper header 10 having a header frame 12 adapted for connection to a harvester lift system (not shown) with an aft connecting portion 16. Transversely spaced finger supports 18 are carried by the lower portion of the frame 12 and extend forwardly to connections with stripper fingers 20. The fingers 20 define narrow, fore-and-aft extending plant receiving spaces 22 which are inclined upwardly in the rearward direction. The cotton plants are guided into the spaces 22 by the forward pointed ends of the fingers 20, and the fingers 20 strip cotton bolls (see 24 of FIG. 1) from the plants as the stalks pass between the fingers with forward movement (F) of the harvester. The action of the plants moving relative to the fingers against the stripped cotton on the fingers tends to move the cotton rearwardly.

To assist movement of the stripped cotton 24 rearwardly over the tops of the fingers 20, first and second feeder shafts 26 and 28 with tines or feeder fingers 30 having overlapping paths are supported for rotation about parallel transverse axes 32 and 34 by side frame members 38 and 40 extending upwardly from the frame 12. The shafts 26 and 28 are tubular with preferably a square cross section. A chain or cog belt drive 42 supported by the frame member 38 rotates the shafts 26 and 28 in timed relation. The cotton 24 is conveyed rearwardly by the action of the plants pulling through the spaces 22 and the feeder shafts 26 and 28. To prevent vines and trash from wrapping around the shafts 26 and 28, vine guard structure 50 is supported above the stripper fingers 20 between the side frame members 38 and 40. In addition, the height of the first or forwardmost shaft 26 is adjustable by pivoting of the members 38 and 40 about the axis 34 of the second shaft 28 by cylinder structure 54 (FIG. 2) connected between the frame 12 and the members. The feeder shaft and vine guard structures will be described in full detail below.

The stripped cotton 24 (FIG. 2) is moved rearwardly over the upper aft ends of the fingers 20 into a transversely extending auger trough 56, and an auger 58 rotatable about a transverse axis 60 conveys the cotton to a central discharge area 62. A conventional air system propels the stripped cotton from the area 62 upwardly and rearwardly toward the harvester basket (not shown).

Figure 7:
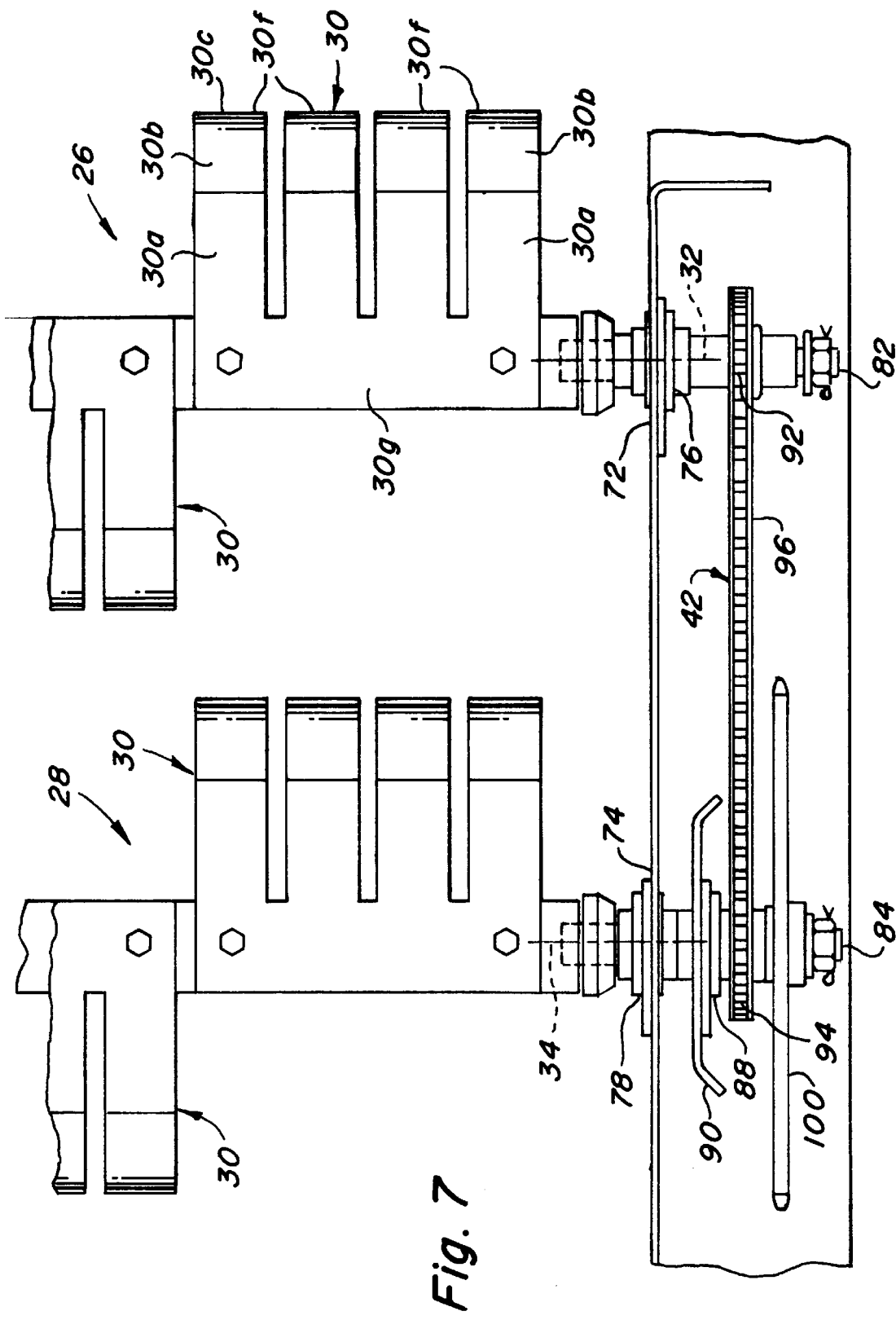
FIG. 7 is an enlarged top view of the bearing and drive area of the feeder shaft support.

The side frame members 38 and 40 have top extremities which support transversely extending, parallel beams 66 and 68 above a plane defined by the upper surfaces of the feeder fingers 30. The beams 66 and 68 connect the members 38 and 40 which include shaft support areas 72 and 74 receiving bearings 76 and 78 (FIG. 7). A lower reinforcing flange area 80 is provided in the members 38 and 40 adjacent the areas 72 and 74. The bearings 76 and 78 mount the shafts 26 and 28 for rotation about the axes 32 and 34.

As shown in FIG. 7, the shafts 26 and 28 have axial extensions 82 and 84 projecting outwardly from the frame member, and the aft shaft extensions 84 are supported in bearings 88 mounted at the upper end of an upright channel-shaped supports 90 fixed to the header frame 12 (FIGS. 2 and 7) adjacent the members 38 and 40. The supports 38 and 40 pivot about the rear shaft axis 34 so the height of the forward shaft 26 can be adjusted.

The drive 42 includes identical gears 92 and 94 (FIG. 7) fixed to the shaft extensions 82 and 84 and a chain 96 trained over gears and an idler 98. A main drive gear 100 is fixed to the shaft extension 84 and connected by a drive chain (not shown) to a conventional reversible drive arrangement to drive the shafts 26 and 28 in timed relationship. The feeder shafts 26 and 28 can be reversed by reversing the drive 42 to clear material from the stripper finger area. A cover 38' (FIG. 1) is releasably secured to the frame member 38 over the drive 42.

The cylinder structure 54 includes a pair of series connected cylinders 104 at each end of the header, each having a base end connected to the frame 12 and a rod end connected to a bracket 106 (FIG. 4) in the flange area 80 of the corresponding side frame member 38 or 40. As the cylinders 104 are extended, the members 38 and 40 and guard structure 50 are rotated in the counterclockwise direction (as viewed in FIG. 2) from a lowermost position to an uppermost position (see 26') about the axis 34 of the aft shaft 28. Retracting the cylinders 104 moves the members back toward the lowermost position. In areas in a field where cotton is short, the cylinders 104 are fully retracted so the path of the feeder fingers 30 on the forward shaft 26 is located closely adjacent the tops of the forward portions of the fingers 20. In tall cotton, the cylinders 104 are extended to raise the forward shaft 26 and help prevent the cotton plants from wrapping on the shaft. The shaft adjustment also helps optimize the combination of finger stripping and shaft feeder finger conveying characteristics to assure that the fingers 20 remove most of the cotton. Cotton loss can occur if the feeder fingers 30 aggressively contact unremoved bolls before the forward movement of the fingers 20 begins to pull the bolls from the plants. The adjustment can be made on the go and assures optimum productivity and minimum cotton loss.

The vine guard structure 50 includes generally identical flanged brackets 116 and 118 (FIGS. 3, 5 and 6). The bracket 116 is bolted to the front face of the beams 66 at locations 122, and the bracket 118 is bolted to the aft face of the beam 68 at locations 124. Each bracket is apertured at 128 adjacent an upper, rearwardly directed flange 130 (FIG. 6) and notched at 136 (FIG. 5) through a portion of a lower angled flange 140. U-shaped guard bars 150 opening upwardly have forward and aft apertured connecting ends 152 and 154 connected by bolts 155 (FIG. 1) to the brackets 116 and 118 at the locations 128. The bolts 115 secure the upper ends of the bars 150 with the portions of the bars below the bolts seated in the notches 136. The guard bars 150 have a channel shaped cross section (FIGS. 1 and 3) for strength and good trash shedding capability. The cross section is concave away from the feeder shafts 26 and 28 so that material inside the guard area around the shafts can easily exit the area and so that materials outside the guard area are less likely to pass between the bars 150 towards the shafts. The bars 150 can be replaced quickly since each bar is held by only two bolts which are in an easily accessible position (FIG. 1).

As best seen in FIG. 2, the paths of the feeder fingers 30 overlap to reduce the dead space between the shafts 26 and 28. The overlapping area extends below the guard bars 150 at a central location on the straight bight portions of the U-shaped bars. In low cotton with the cylinders 104 retracted, the bight portion is generally parallel to the plane of the upper surfaces of the stripping fingers 20, and both paths of the feeder fingers 30 closely approach that plane. As shown in FIGS. 1 and 2, the effective radii of the feeder shafts (R1) is relatively large and on the order of ten inches (25 cm) for increased effective boll sweeping area. The feeder fingers 30 extend downwardly (FIG. 2) below adjacent bars 150 at least approximately half the radius R1.

In the preferred embodiment, the feeder fingers 30 are connected in alternating projecting fashion along the lengths of the shafts 26 and 28 (FIG. 1). The alternating arrangement of the fingers 30 and the timed drive 42 prevent interference and assure optimum feeder characteristics with minimum dead space. The fingers 30 include parallel connecting portions 30a (FIGS. 1 and 3) which are apertured and embrace opposite walls of the shaft. The connecting portions 30a lie generally along spaced, parallel planes and extend radially from the shaft to junctures with converging portions 30b terminating in an apex 30c which is centrally located between the planes of the connecting portions. The fingers 30 are symmetrical so they can be mounted in either orientation on the shaft 26 or 28. As shown, each finger 30 includes four finger portions 30f connected to a base portion 30g which includes apertures 30h for receiving bolts that releasably secure the finger to the shaft. The finger 30 is fabricated from a flat, rectangular piece of metal stock which is slotted and apertured and then bent into the symmetrical configuration shown. The above tooth construction provides a strong, easily replaceable configuration. The symmetrical construction also assures that feeder shaft aggressiveness is generally the same for both forward and reverse operation of the shafts 26 and 28 by the drive 42.

In tall cotton, the cylinders 104 are extended to rotate the members 38 and 40 and raise the forward feeder shaft 26 (26' of FIG. 1) so that more of the cotton plants are pulled between the fingers 20 before the feeder fingers 30 contact the plant and so that the plant is less likely to entangle in the feeder shaft. The guard structure 50 moves with vertical adjustment of the shaft 26 to optimize resistance to vine and plant wrap. The bolls 24 are pulled from the plants by the forward motion of the fingers through the plants. The sweeping action of the feeder fingers assists the rearward movement of the bolls 24 into the auger trough 56.

Having described the preferred embodiment, it will become apparent that various modifications can be made without departing from the scope of the invention as defined in the accompanying claims.

We claim:

1. In a cotton stripper header adapted for movement in a forward direction over a field having closely spaced cotton plants, the header including a header frame and a finger assembly connected to the frame for stripping cotton from the plants, feeder shaft structure to convey the stripped cotton, comprising:

shaft support structure connected to the frame;

a first feeder shaft having first radial projections;

a second feeder shaft having second radial projections;

the shaft support structure supporting the first and second feeder shafts for rotation about axes extending transverse to the forward direction above the finger assembly;

wherein the first and second projections define overlapping paths located above the finger assembly for directing stripped cotton rearwardly over the finger assembly; and lift structure connected to the first feeder shaft for raising and lowering the first feeder shaft relative to the finger assembly.

2. The feeder shaft structure set forth in claim 1 wherein the radial projections define an effective feeder shaft radius of at least ten inches.

3. The feeder shaft structure set forth in claim 1 wherein the feeder shaft structure further includes a timed drive for driving the feeder shafts in timed relationship relative to each other.

4. The feeder shaft structure set forth in claim 1 further comprising shield structure extending between the radial projections for preventing wrapping of plant material around the feeder shafts, wherein the shield structure is movable vertically with the first feeder shaft.

5. In a cotton stripper header adapted for movement in a forward direction over a field having closely spaced cotton plants which vary in height, the header including a header frame and a finger assembly connected to the frame for stripping cotton from the plants, feeder shaft structure to convey the stripped cotton, comprising:

shaft support structure connected to the frame;

a first feeder shaft having first radial projections;

a second feeder shaft having second radial projections;

feeder shaft support structure supporting the first and second feeder shafts for rotation about axes extending transverse to the forward direction above the finger assembly; and vertical adjustment structure for moving at least one of the feeder shafts vertically relative to the stripper finger assembly on-the-go to accommodate varying cotton plant heights.

6. The feeder shaft structure as set forth in claim 5 wherein the radial projections have ends defining projection paths, the projection paths located above the finger assembly.

7. The feeder shaft structure set forth in claim 6 wherein the feeder shafts are rotated in timed relationship relative to each other and the projection paths overlap above the finger assembly.

8. The feeder shaft structure as set forth in claim 5 further comprising shield structure interposed between the radial projections for preventing wrapping of vegetation around the shafts as the shafts rotate.

9. The feeder shaft structure as set forth in claim 5 wherein the feeder shaft support structure supports the first and second feeder shafts for rotation about first and second axes, and the feeder shaft support structure is rotatable about the second axis to adjust the first feeder shaft vertically relative to the stripper finger assembly.

10. The feeder shaft structure as set forth in claim 8 wherein the shield structure comprises first and second brackets including a flange with supporting slots, and upwardly opening U-shaped bars connected at upper ends to the brackets and secured within the supporting slots.

11. Feeder shaft structure for a finger type cotton stripper header for conveying cotton bolls over stripper fingers and having a tubular shaft with opposite generally parallel, planar sidewalls and rotatable about a shaft axis, the feeder shaft structure comprising:

a feeder shaft finger member including planar connecting portions lying generally along parallel spaced planes and adapted to embrace the opposite sidewalls of the shaft, the connecting portions extending radially to junctures with outwardly converging portions terminating in an apex centrally located between the planes.

12. The feeder shaft structure as set forth in claim 11 wherein the finger structure includes a base portion, and a plurality of individual finger portions connected to and extending radially from the base portion.

13. The feeder shaft structure as set forth in claim 12 wherein the finger structure is fabricated from a flat, rectangular piece of metal stock which is slotted and apertured and then bent into a symmetrical configuration to thereby provide generally identical conveying characteristics when rotated in either direction about the shaft axis.

* * * * *